(12) United States Patent
Popp et al.

(10) Patent No.: US 6,603,899 B1
(45) Date of Patent: Aug. 5, 2003

(54) OPTICAL BUS

(75) Inventors: Harold W Popp, Jackson, NJ (US); John F Ribera, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 226 days.

(21) Appl. No.: 09/634,229

(22) Filed: Aug. 9, 2000

(51) Int. Cl.$^7$ .............................. G02B 6/26; G02B 6/28
(52) U.S. Cl. .......................... 385/31; 385/24; 385/44; 385/16; 385/48
(58) Field of Search ................... 385/31, 47, 48, 385/16, 24, 44

(56) References Cited

U.S. PATENT DOCUMENTS

| | | | | |
|---|---|---|---|---|
| 3,814,498 A | * | 6/1974 | Tomlinson et al. | ........... 385/37 |
| 4,112,293 A | * | 9/1978 | Kach | |
| 4,707,057 A | * | 11/1987 | Takahashi et al. | |
| 5,528,710 A | * | 6/1996 | Burton et al. | ................. 385/16 |
| 5,809,186 A | * | 9/1998 | Miller | ......................... 385/14 |
| 5,809,187 A | * | 9/1998 | Peck et al. | ..................... 385/24 |
| 6,356,679 B1 | * | 3/2002 | Kapany | ....................... 385/18 |

FOREIGN PATENT DOCUMENTS

JP            55-29841        *  3/1980  ................. 385/44

OTHER PUBLICATIONS

Thermo Optic Switch (TOS) Arrays, www.kymata.com ; Preliminary Product Information (date unknown).
Multi–Channel Variable Optical Attenuator (VOA), www.kymata.com ; Product Information (date unknown).
"Arrayed Waveguide Grating (AWG)" www.kymata.com ; Product Information (date unknown).
Zheng, S. Q. et al: "Pipelined Asychronous Time–Division Multiplexing Optical Bus" Optical Engineering, Soc. of Photo–Optical Instrumentation Engineers. Bellingham, U.S., vol. 36, No. 12, Dec. 1, 1997, pp. 3392–3400, XP000731399, ISSN: 0091–3286.
Chen, C–C. et. al.: "A Wavelength Encoded Multichannel Optical Bus for Local Area Networks" Journal of Lightwave Technology, IEEE. New York, U.S., vol. 14, No. 3, Mar. 1, 1996, pp. 315–322, XP000586116, ISSN: 0733–8724.
Taboada, J. M. et. al.: "Thermo–Optically Tuned Cascaded Polymer Waveguide Taps" Applied Physics Letters, American Institute of Physics. New York, U.S., vol. 75, No. 2, Jul. 12, 1999, pp. 163–165, XP000850754, ISSN: 0003–6951.
Prucnal, P. R. et. al.: "Low–Loss, High–Impedance Integrated Fiber–Optic Tap" Optical Engineering, Soc. of Photo–Optical Instrumentation Engineers. Bellingham, U.S., vol. 29, No. 9, Sep. 1990, pp. 1136–1142, XP000159042, ISSN: 0091–3286.
Zicheng Guo: "Optically Interconnected Processor Arrays with Switching Capability" Journal of Parallel and Distributed Computing, Academic Press, Duluth, MN, U.S., vol. 23, No. 3, Dec. 1, 1994, pp. 314–329, XP000483431, ISSN: 0743–7315.

* cited by examiner

Primary Examiner—Rodney Bovernick
Assistant Examiner—Mike Stahl

(57) ABSTRACT

An optical bus for distributing optical signals. In one form, the optical bus comprises an optical fiber comprising an integrated array of thermal switches at predetermined intervals. In another form, the optical bus comprises an optical fiber comprising an integrated array of optical beam splitters at predetermined intervals.

4 Claims, 8 Drawing Sheets

OPTICAL BUS

BACKGROUND OF THE INVENTION

1. Field of the Invention

This invention relates generally to optical communications and, more particularly, to the coupling and distribution of optical signals.

2. Background of the Invention

In the area of optical communications, there is a need to distribute, or redirect, optical streams (gigabit per second rates or higher) from one, or more, source devices to one, or more, destination devices. One solution is to first convert an optical signal to its electrical equivalent and then apply the resulting electrical signal(s) to an electrical bus, which is used to interconnect the various devices. (As known in the art, an electrical bus comprises one or more electrical conductors for distributing one or more electrical signals from one, or more, source devices to one, or more, destination devices.) Unfortunately, there are added costs involved with this electrical conversion, e.g., there is the dollar cost of the electrical components themselves that are required to convert the signal from an optical form to an electrical form and back again—and there is also a performance cost in terms of having to process high-speed gigabit optical signals in the electrical domain that may introduce distortion and delay.

SUMMARY OF THE INVENTION

An optical bus for distributing optical signals. In particular, a light guide comprises an array of embedded elements for coupling light between a plurality of ports of the light guide.

In one embodiment, the light guide is an optical fiber comprising an integrated array of thermal switches at predetermined intervals.

In another embodiment, the light guide is an optical fiber comprising an integrated array of optical beam splitters at predetermined intervals.

DETAILED DESCRIPTION

Figure 1:
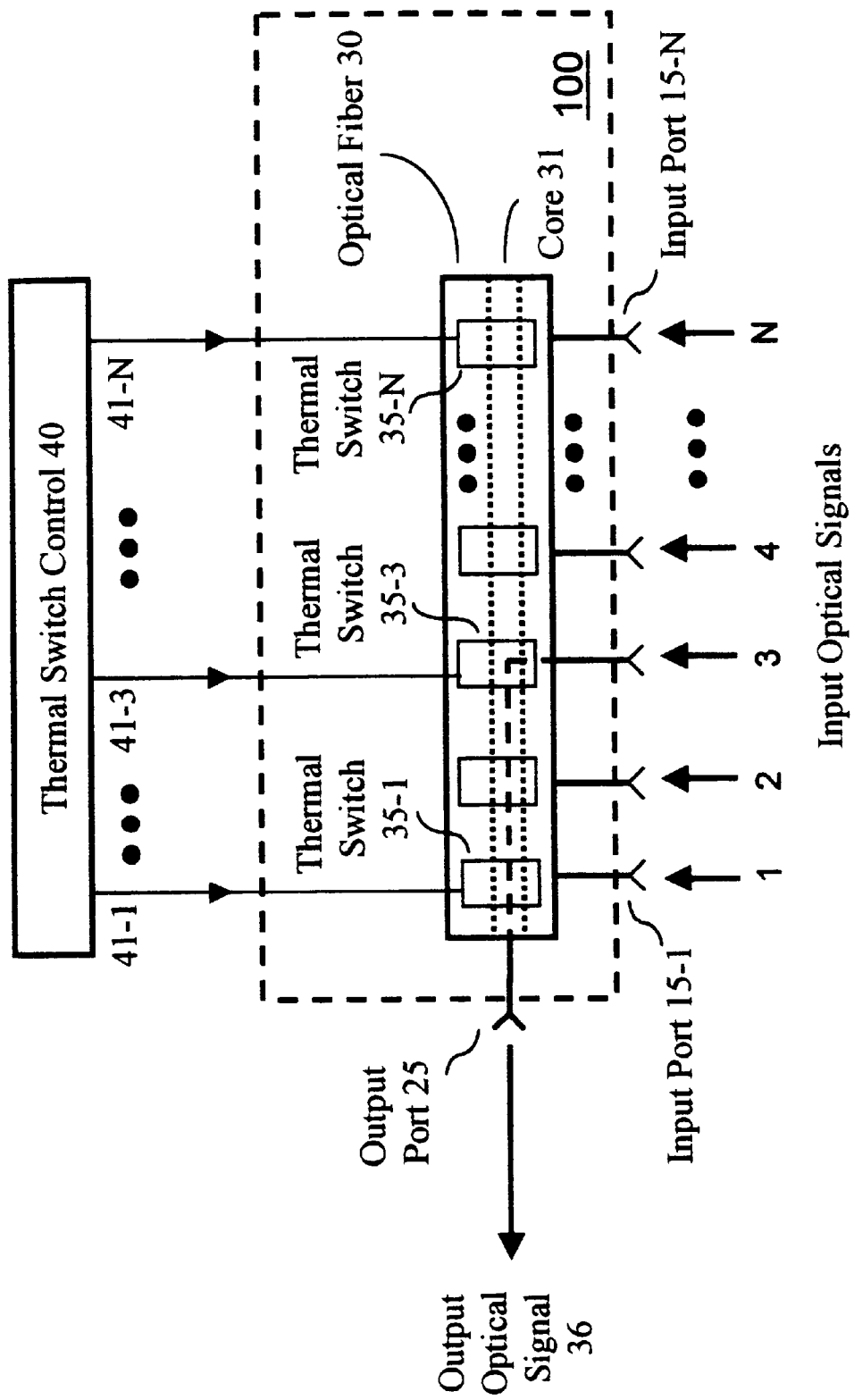
FIG. 1 shows an illustrative embodiment of an optical bus in accordance with the principles of the invention.

An illustrative embodiment of an optical bus in accordance with the principles of the invention is shown in FIG. 1. Optical Bus 100 comprises a light guide with embedded elements for coupling light between a plurality of ports of the light guide. Illustratively, the light guide is represented by optical fiber 30 (presumed to be a single mode optical fiber), and the embedded elements are represented by a plurality of thermal switches 35-1 through 35-N spaced at predetermined (e.g., uniform) intervals in optical fiber 30 (also referred to as an "in-line thermal optical bus"). Each thermal switch is controlled via thermal switch control element 40 (control signals 41-1 through 41-N). For reference purposes, lower numbered thermal switches are considered "upstream" of higher numbered thermal switches (or, higher numbered thermal switches are "downstream" of lower numbered thermal switches). For example, thermal switch 35-1 is upstream of thermal switch 35-3, while the latter is downstream of thermal switch 35-1. Other than the inventive concept, the elements shown in FIG. 1 are well-known and will not be described in detail. For example, an optical fiber comprises a core and a cladding. Similarly, a thermal switch, by itself, is known in the art, (e.g., a thermal switch can be purchased from Kymata Ltd. and information can be found at "www.kymata.com"). Likewise, thermal switch control 40 represents a stored-program control based-processor (e.g., a microprocessor) and associated memory (both not shown) for providing control signals 41-1 through 41-N. It is presumed that thermal switch control 40 is suitably programmed using conventional programming techniques, which, as such, will not be described herein.

Optical fiber 30 comprises N input ports (15-1 through 15-N) along its length (physically, each input port of optical fiber 30 is an access point, window, or hole, to let in light). Each thermal switch has two input ports and one output port (not explicitly shown in FIG. 1), i.e., each thermal switch is a 1×2 switch. One input port of each thermal switch is coupled through one of the N input ports of optical fiber 30 to receive one of N input optical signals (from any of N optical sources (not shown)). The other input port of each thermal switch is coupled to the core 31 of optical fiber 30. As can be observed from FIG. 1, effectively this other input port of each thermal switch is coupled to the output port of the next downstream thermal switch. For example, one input port of thermal switch 35-1 is coupled to input port 15-1 for receiving input optical signal 1, and the other input port of thermal switch 35-1 is coupled (via that portion of core 31 of optical fiber 30) to the output port of thermal switch 35-2. The output port of thermal switch 35-1 is coupled to that portion of core 31 of optical fiber 30 that provides the output optical signal 36, via output port 25. (It should be noted that each input optical signal may comprise one or more wavelengths, e.g., an optical signal may have a single wavelength or have multiple wavelengths (a WDM (wavelength division multiplexed) signal).)

Thermal switch control 40 controls the state of each thermal switch. As used herein, when a thermal switch is "ON," optical energy is coupled from that input port of the thermal switch that is coupled to a corresponding input port of optical fiber 30 to the output port of the thermal switch (and hence into core 31 of optical fiber 30). Conversely, when a thermal switch is "OFF," optical energy is coupled from that input port of the thermal switch that is coupled to core 31 of optical fiber 30 to the output port of the thermal switch (and hence back into core 31 of optical fiber 30 for transmission further upstream). Consequently, when a thermal switch is "OFF," light is propagated through optical fiber 30, going upstream from one thermal switch to the next upstream thermal switch. Conversely, when a thermal switch is "ON," light is let into the core of the optical fiber and light from any other downstream thermal switch is blocked. For example, consider thermal switch 35-3. When thermal switch 35-3 is controlled to be "ON," light applied via input port 15-3 is propagated into core 31 of optical fiber 30 via thermal switch 35-3. Assuming that thermal switches 35-1 and 35-2 are "OFF," this light is propagated through optical fiber 30 to become output optical signal 36 (albeit with some attenuation). Since thermal switch 35-3 is "ON," any downstream light propagating through optical fiber 30, e.g., via downstream thermal switches 35-4 through 35-N, is blocked. Thus, in this illustrative embodiment, it is assumed that only one thermal switch is "ON" at a time to permit light from the corresponding input port to enter optical fiber 30 for propagation through optical fiber 30 (and any upstream thermal switches) to emerge as the output optical signal 36. It should be noted that to compensate for any attenuation loss of the input optical signal, an optical amplifier (not shown in FIG. 1) may be used to amplify output optical signal 36. However, it is known that a thermal switch has a low amount of attenuation loss, which may relegate the use of an optical amplifier to larger optical bus structures.

Figure 2:
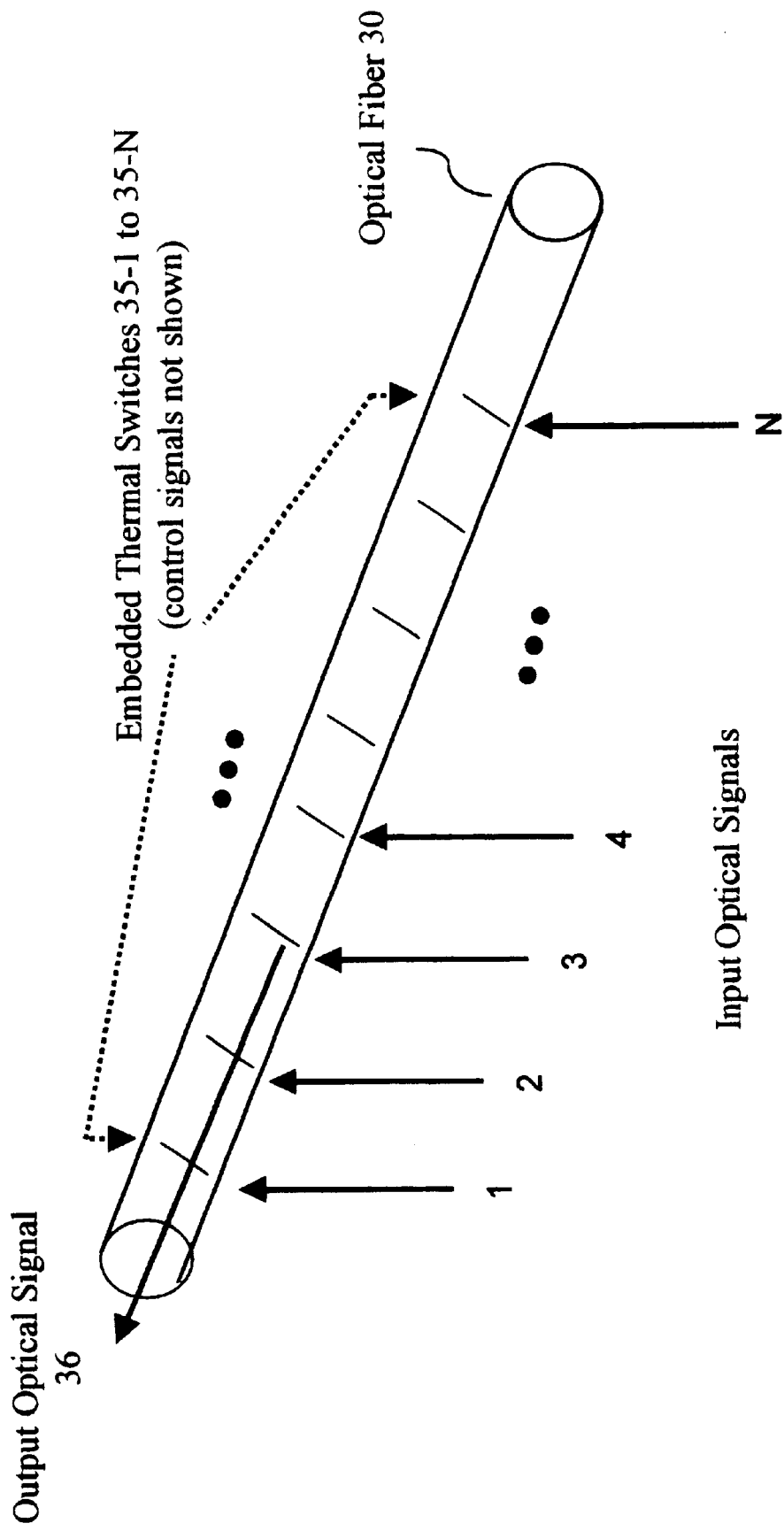
FIGS. 2 and 3 show other views of the embodiment of FIG. 1.

Another view of the embodiment of FIG. 1 is shown in FIG. 2. In the latter, optical fiber 30 is shown receiving N input optical signals along the length of optical fiber 30 (where each of the corresponding N input ports are located). Embedded thermal switches 35-1 through 35-N are represented by slash marks "/." Illustratively, thermal switch 35-3 is "ON," which (as described above) lets input optical signal 3 into optical fiber 30, which subsequently emerges as output optical signal 36.

Figure 3:
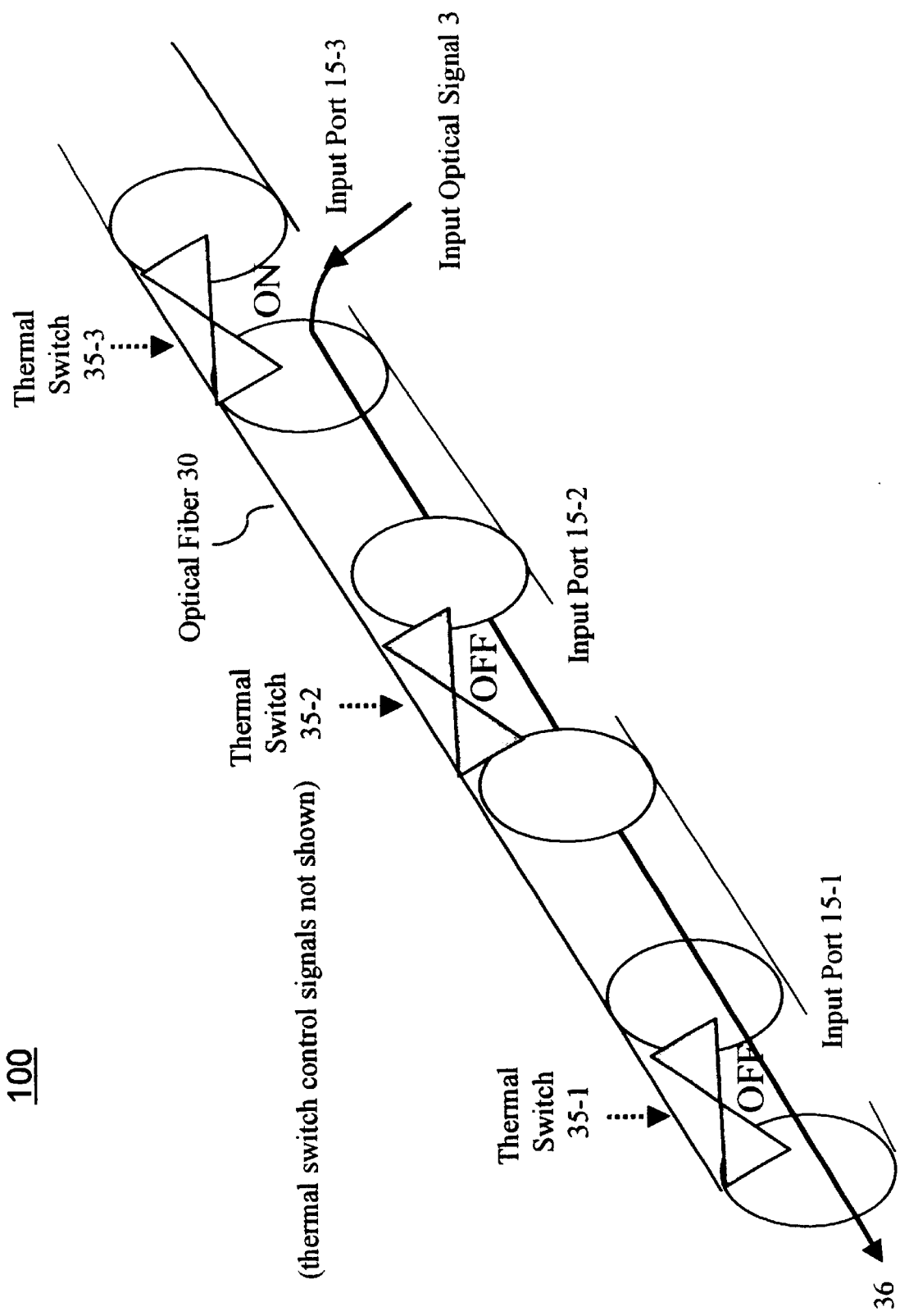

Similarly, another view of the embodiment of FIG. 1 is shown in FIG. 3. Here, a portion of optical fiber 30 is shown comprising the first three thermal switches, 35-1, 35-2 and 35-3. Each of these thermal switches is coupled to a corresponding input port as illustrated by input ports 15-1, 15-2 and 15-3. Illustratively, thermal switch 35-3 is "ON" and thermal switches 35-1 and 35-2 are "OFF," which (as described above) lets input optical signal 3 into optical fiber 30, which subsequently emerges as output optical signal 36. In other words, optical fiber 30 represents a light guide comprising an optical channel (core 31 of optical fiber 30) for conveying light such that a plurality of elements are embedded along the optical channel, each embedded element disposed within the light guide for receiving light either from an associated access point of the light guide (e.g., 15-1, 15-2, 15-3, etc.) or from the optical channel (e.g., core 31 of optical fiber 30).

An illustrative manufacturing procedure for a thermal optical bus as illustrated in FIGS. 1–3 is to use industry standard Silica-on-Silicon techniques (or other appropriate technology) and assemble embedded thermal-optical 1×2 switches into an in-line array within a light guide structure. (Silica glass is compatible with single mode fibers.) The thermal switch array utilizes multiple thermal optical switches placed in-line with an associated input access point for receiving input optical signals along the length of the light guide structure. The individual thermal optical switches are controlled through individual heater control signals associated with each input signal position.

As noted above, when a thermal switch is "ON," downstream light is blocked. This allows an input optical signal having one or more wavelengths (e.g., a WDM signal) to be propagated to the output port of the optical bus without mixing with other input optical signals. However, since the downstream light is blocked, an optical bus comprising integrated thermal switches is not conducive to generating a WDM signal from different input optical signals, each having a different wavelength.

Figure 4:
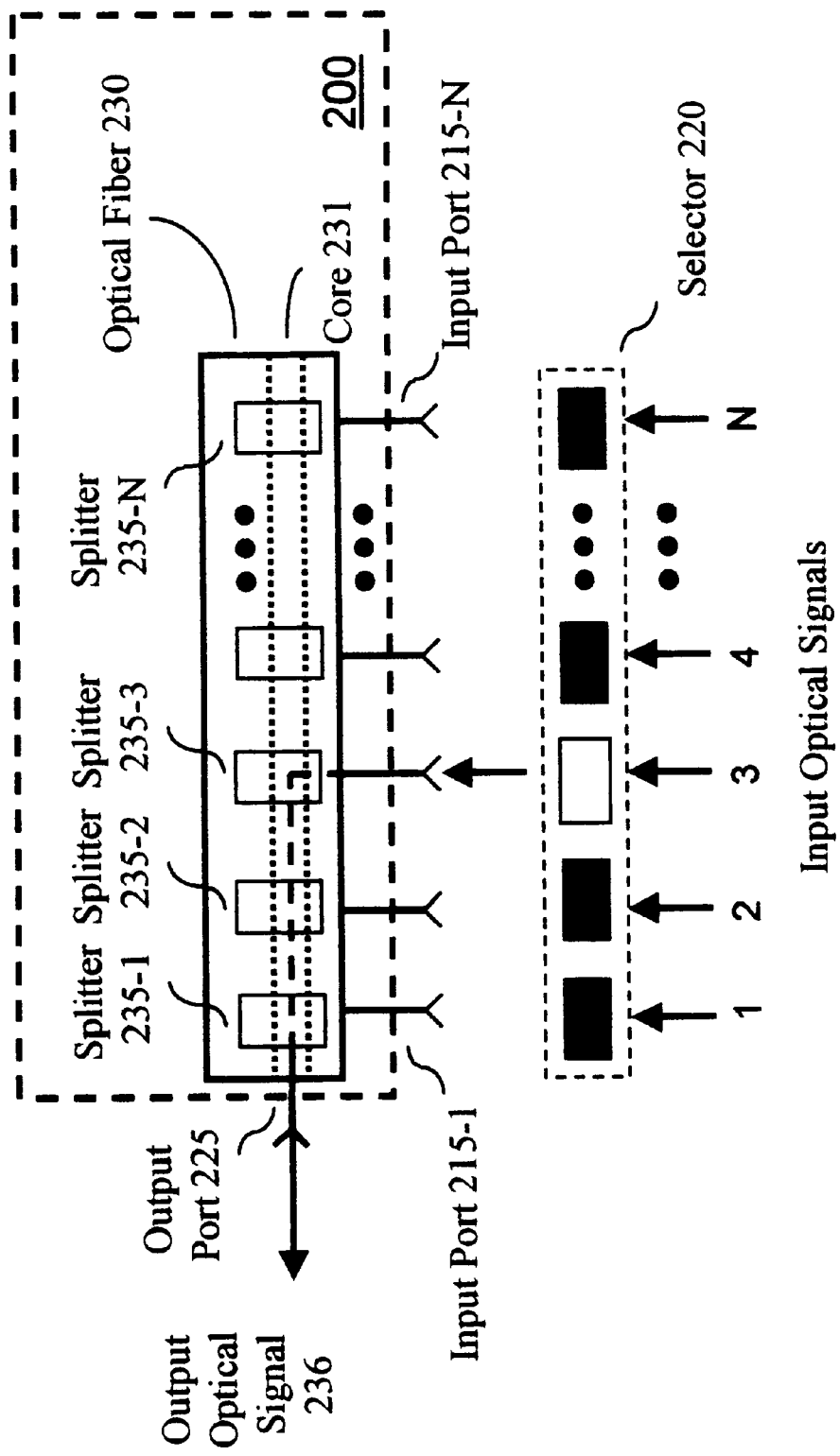
FIG. 4 shows another embodiment of an optical bus in accordance with the principles of the invention.

In contrast, another illustrative embodiment of an optical bus in accordance with the principles of the invention is shown in FIG. 4. Optical Bus 200 comprises a light guide with embedded elements for coupling light between a plurality of ports of the light guide. Illustratively, the light guide is represented by optical fiber 230 (presumed to be a single mode optical fiber), and the embedded elements are represented by a plurality of optical beam splitters (splitters) 235-1 through 235-N spaced at predetermined (e.g., uniform) intervals in optical fiber 230 (also referred to as an "in-line splitter optical bus"). For reference purposes, lower numbered splitters are considered "upstream" of higher numbered splitters (or, higher -numbered splitters are "downstream" of lower numbered splitters). For example, splitter 235-1 is upstream of splitter 235-3, while the latter is downstream of splitter 235-1. Other than the inventive concept, the elements shown in FIG. 4 are well-known and will not be described in detail. For example, an optical fiber comprises a core and a cladding. Similarly, a splitter, by itself, is known in the art.

Optical fiber 230 comprises N input ports (215-1 through 215-N) along its length (again, physically, each input port of optical fiber 230 is an access point, window, or hole, to let in light). Each splitter has two input ports and one output port (not explicitly shown in FIG. 4). One input port of each splitter is coupled through one of the N input ports of optical fiber 230 to receive one of N input optical signals (from any of N optical sources (not shown)). The other input port of each splitter is coupled to core 231 of optical fiber 230. As can be observed from FIG. 4, effectively this other input port of each splitter is coupled to the output port of the next downstream splitter. For example, one input port of splitter 235-1 is coupled to input port 215-1 for receiving input optical signal 1 (via selector 220 (described below)), the other input port of splitter 235-1 is coupled (via that portion of core 231 of optical fiber 230) to the output port of splitter 235-2. The output port of splitter 235-1 is coupled to that portion of core 231 of optical fiber 230 that provides the output optical signal 236, via output port 225.

Unlike the embodiment illustrated in FIG. 1, a splitter does not block light, i.e., some light is reflected and some light is passed through. Thus, with respect to optical bus 200 (ignoring for the moment selector 220) light applied at any input port will mix with light applied at other input ports. As such, an optical bus comprising splitters is useful in (WDM) applications, since light of different wavelengths can be applied to different ones of the input ports 215-1 through 215-N with the result that output optical signal 236 is a WDM signal. (It should also be noted that, strictly speaking, the input ports of optical fiber 230 also serve as output ports, since some light is reflected. In other words, they are bi-directional ports since some light from downstream splitters will appear on the upstream input ports. Indeed, this feature is taken advantage of in one of the optical applications described further below.)

However, in the situation where the input optical signals all have the same wavelength it is necessary to block light from certain ones of the input ports to prevent inadvertent mixing of the input optical signals within core 231 of optical fiber 230. (Indeed, it may even be advantageous to do this in a WDM application.) Thus, selector 220 is used to block the input optical signals. Selector 220 (control signals not shown) enables one input optical signal at a time to be applied to optical fiber 230. Although not necessary to the inventive concept, selector 220 is, e.g., an array of thermal 1×2 switches, with one of the input ports of each thermal switch unused. Alternatively, selector 220 is an array of liquid crystal pixel elements such as described and shown in the co-pending, commonly assigned U.S. Patent application of Ranganath et al., entitled "An Optical CrossBar Switch," application Ser. No. 09/478,630, filed on Jan. 6, 2000, now abandoned. Control circuitry for either element is straightforward and is not described herein. Similar to the description of optical bus 100, each element of selector 220 can be referred to as having an "ON" state, i.e., optical energy is coupled to the corresponding input port of optical fiber 230, and an "OFF" state, i.e., light is blocked from the corresponding input port of optical fiber 230. This is illustrated in FIG. 4, where selector 220, element 3, is turned "ON" to allow light to enter optical fiber 230 via input port 215-3. Other elements of selector 220 are "OFF." As such, only light from input optical signal 3 transits optical fiber 230 to become output optical signal 236 (albeit with some attenuation). Thus, in a non-WDM application, it is assumed that only one element of selector 220 is on at a time to permit light from the corresponding input port to enter optical fiber 230 for propagation through optical fiber 230 to emerge as the output optical signal 236. (It should be noted that selector 220 can be controlled so as to let more than one input optical signal into optical fiber 230, if so desired.)

Figure 5:
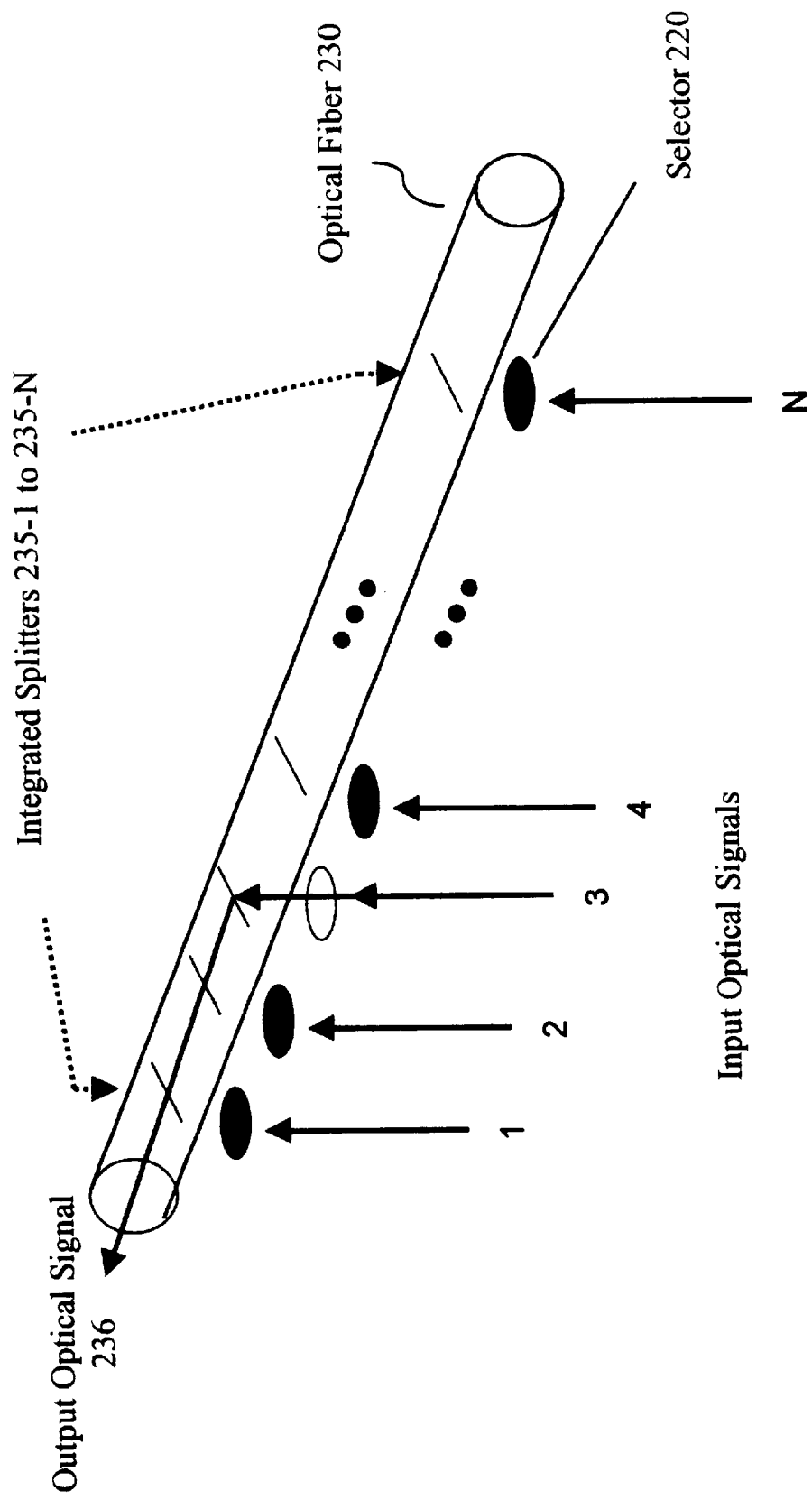
FIG. 5 shows another view of the embodiment of FIG. 4.

Another view of the embodiment of FIG. 4 is shown in FIG. 5. In the latter, optical fiber 230 is shown receiving any one of N input optical signals along the length of optical fiber 230 (where each of the corresponding N input ports are located). Embedded splitters 235-1 through 235-N are represented by slash marks "/." Illustratively, selector 220 (as described above) lets input optical signal 3 pass through into optical fiber 230 and blocks all other input optical signals. Input optical signal 3 subsequently emerges as output optical signal 236.

Figure 6:
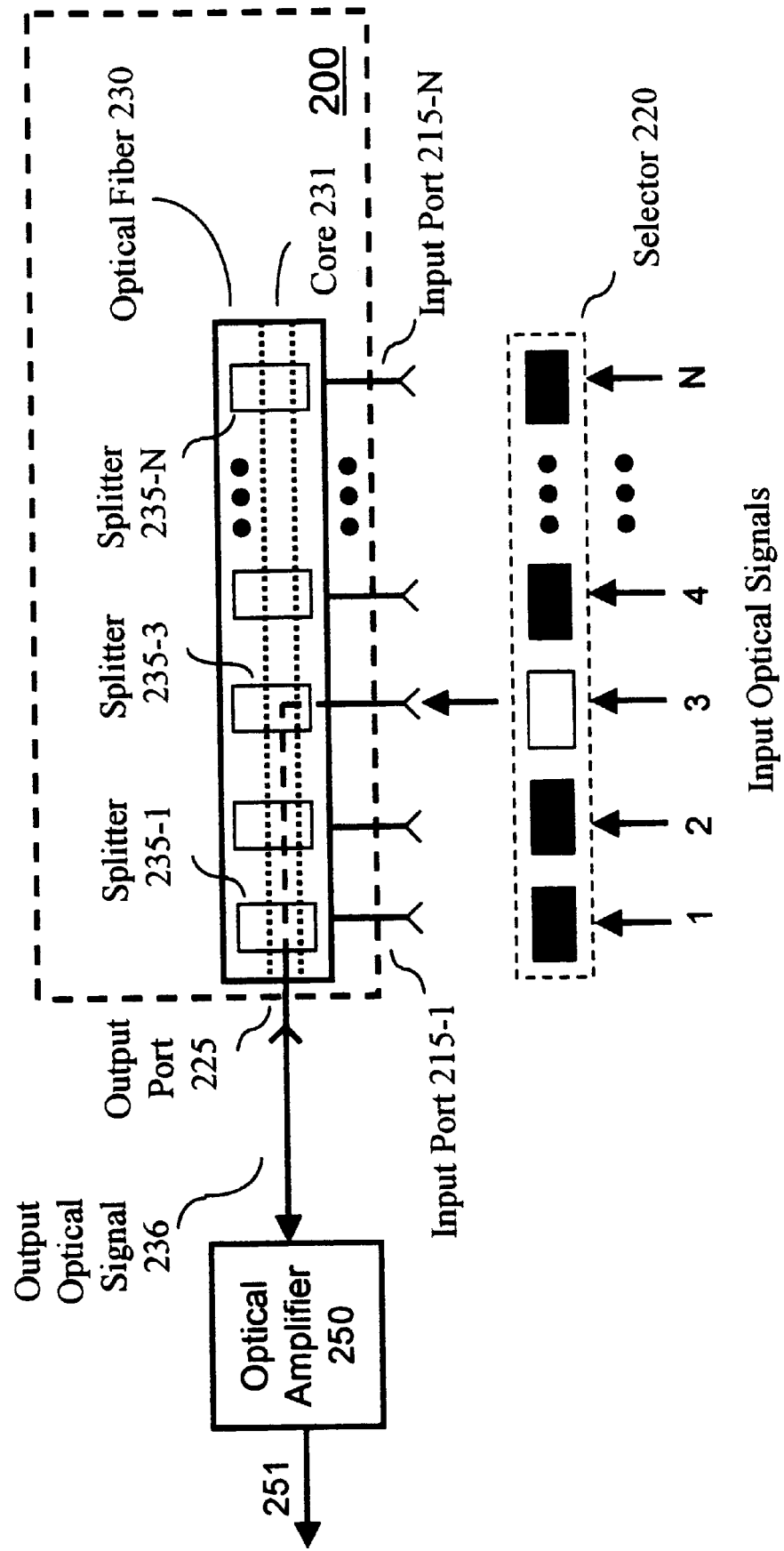
FIG. 6 shows another embodiment of an optical bus in accordance with the principles of the invention.

This embodiment of an optical bus utilizes embedded splitter elements that may have a significant amount of attenuation loss to an input optical signal. (For example, an optical beam splitter may have a 60/40 ratio, i.e., 60% of the light is let through, while 40% of the light is reflected.). As such, an optical amplifier may be used to amplify the output optical signal in order to compensate for loss through the splitters. This is illustrated in FIG. 6, which shows output optical signal 236 being applied to optical amplifier 250, which provides an amplified optical signal 251. (This is in contrast to the above-described optical bus 100, which utilizes thermal switch elements that have lower forward light loss.)

An illustrative manufacturing procedure for a beam splitter optical bus as illustrated in FIGS. 4–6 is to use industry standard Silica-on-Silicon techniques (or other appropriate technology) and assemble embedded optical beam splitter elements into an in-line array within a light guide structure. (Silica glass is compatible with single mode fibers.) The optical beam splitter array utilizes multiple optical beam splitters placed in-line with an associated input access point for receiving input optical signals along the length of the light guide structure. The individual optical beam splitters are passive and require no external control signals. The amount of coating on each optical beam splitter determines the ratio of reflected light to transmitted light, which is predetermined by design. Standard methods of fusion splicing, photolithography and reactive ion etching may be used to construct the optical bus.

Figure 7:
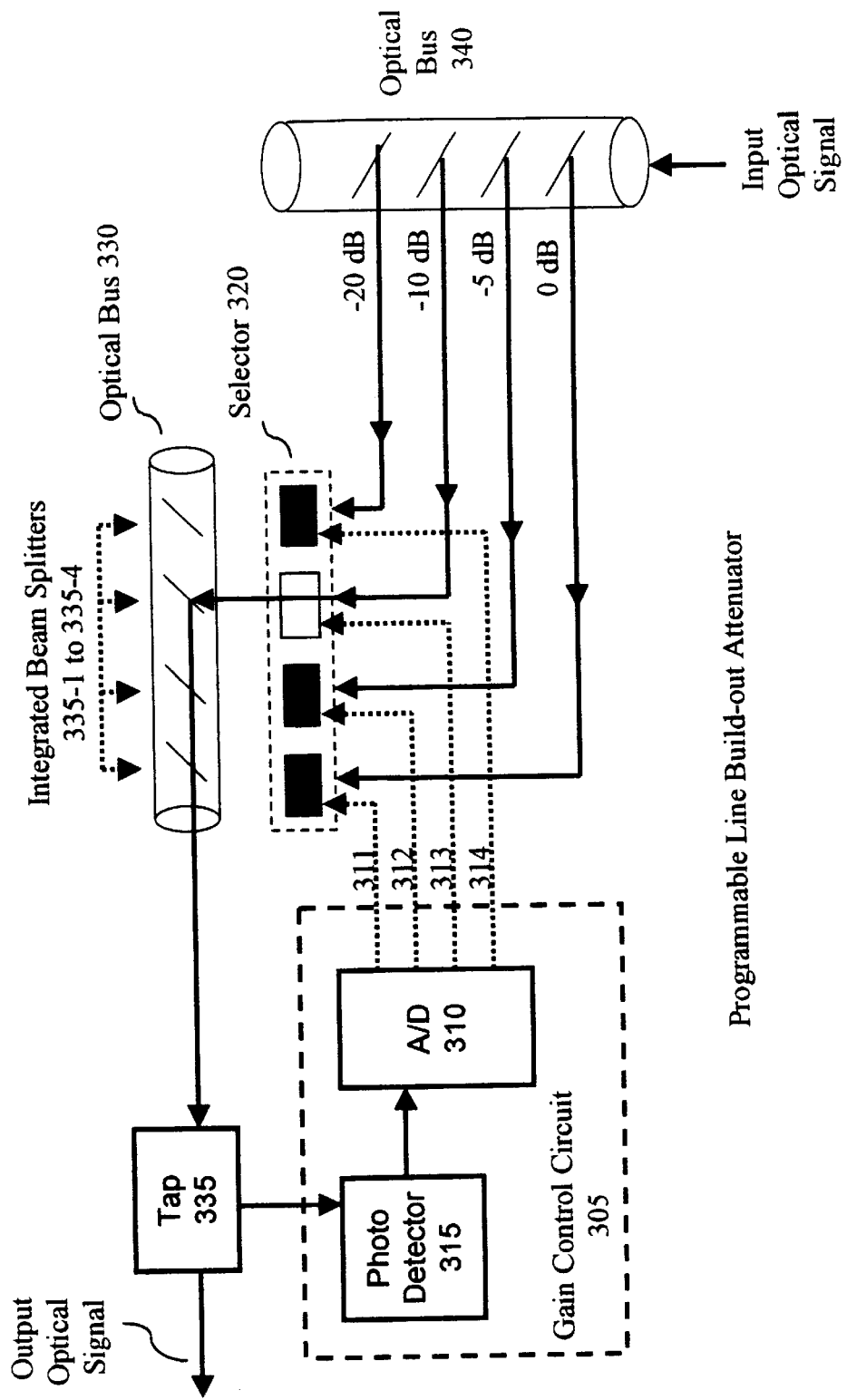
FIGS. 7 and 8 show illustrative applications of the inventive concept.
Figure 8:
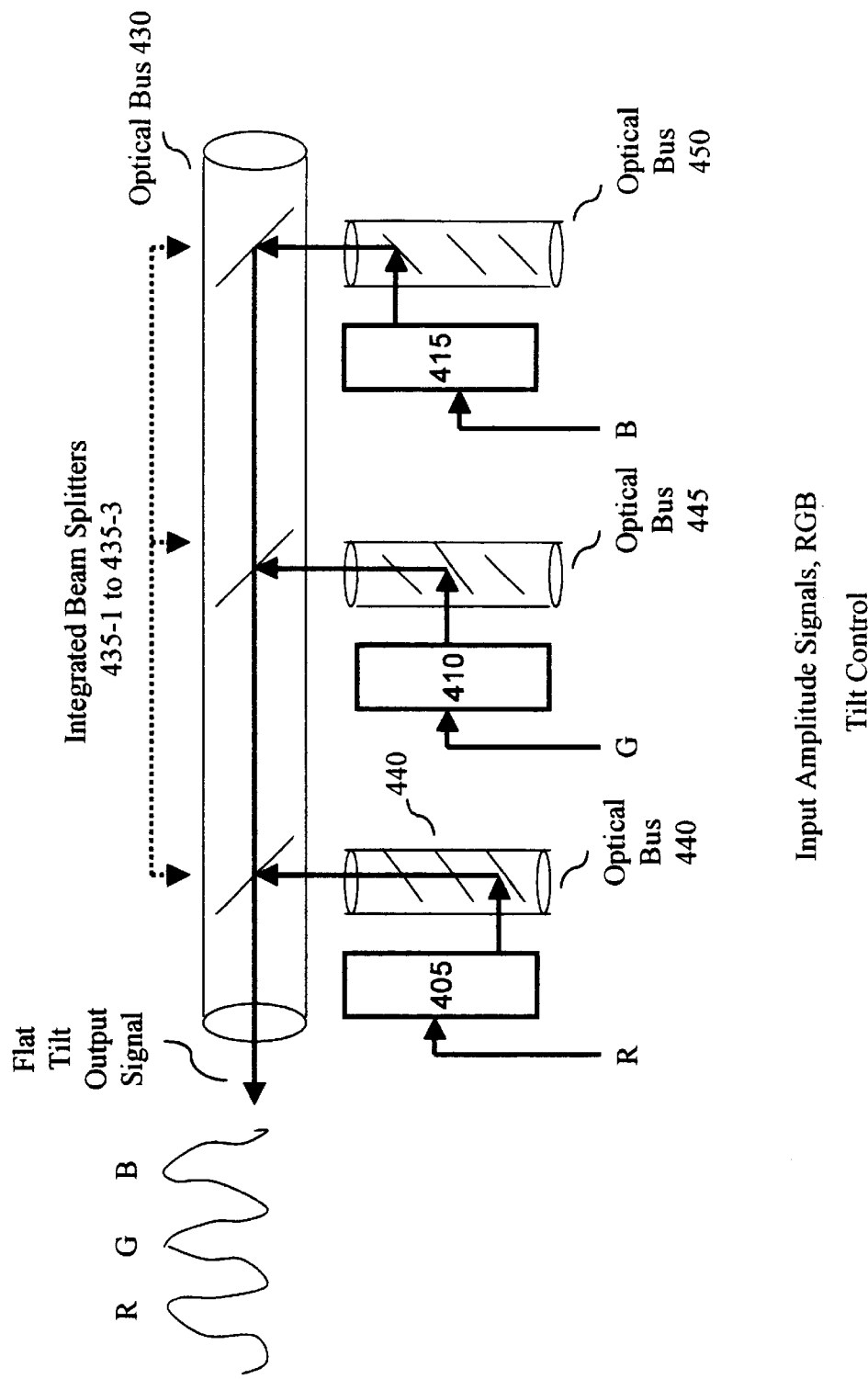

Some illustrative applications of an optical bus in accordance with the principles of the invention are shown in FIGS. 7 and 8. FIG. 7 illustrates the use of an optical bus as part of a programmable line build-out attenuator, which is used to receive an input optical signal of varying energy level (a "hot signal") and to provide an output optical signal at a predefined energy level. In particular, the programmable line build-out attenuator comprises optical bus 330, optical bus 340, selector 320, tap 335 and gain control circuit 305, which further comprises photo detector 315 and analog-to-digital (A/D) element 310. An input optical signal is applied to optical bus 340. The latter is illustratively an inline splitter optical bus (as shown in FIG. 4). As noted above, each splitter both reflects and transmits light. As such, as light passes through each splitter of optical bus 340, varying degrees of attenuation are introduced into the input optical signal. Since each splitter both reflects and transmits light, some light appears as an output signal at, what heretofore were referred to as the input ports of the optical bus. These are shown in FIG. 7 as attenuation taps 0 dB (decibels), −5 dB, −10 dB and −20 dB. Each of the output signals from the attenuation taps is applied to an element of selector 320. The latter is controlled by gain control circuit 305 via control lines 311, 312, 313 and 314. In this example, it is assumed that gain control circuit 305 turns "ON" element 3, via control line 313, of selector 320 to enable light to pass through to a corresponding input port of optical bus 330, which is also illustratively an inline splitter optical bus. (However, it could also be an inline thermal optical bus as illustrated in FIG. 1. In this case, selector 320 is not needed and gain control circuit 305 controls each thermal switch via control signals 311, 312, 313 and 314.) Optical bus 330 provides an optical signal (again at a certain attenuation level) to tap 335, which provides the output optical signal and also provides an optical feedback signal to gain control circuit 305. The latter receives the optical feedback signal via photo detector 315, which converts the optical signal into an electrical signal that is provided to A/D converter element 310. Depending on the level of the optical feedback signal, A/D converter element 310 operates such that a different one of the control signals 311, 312, 313 and 314 is enabled to turn on a particular element of selector 320. Thus, the energy level of the output optical signal is controlled by selecting different ones of the attenuation taps of optical bus 340.

Turning now to FIG. 8, an optical tilt control application of an optical bus in accordance with the principles of the invention is shown. The optical tilt control comprises selectors 405, 410, and 415, and optical buses 440, 445, 450 and 430. It is assumed for this application that all optical buses are of the inline splitter optical bus. This particular application takes advantage of the WDM capability of an inline splitter optical bus. Optical buses 440, 445 and 450, each receive an input optical signal at a different wavelength as provided by corresponding selectors 405, 410 and 415 (the control signals for these selectors are not shown). In particular, an input signal having a wavelength R is provided to optical bus 440, an input signal having a wavelength G is provided to optical bus 445 and an input signal having wavelength B is provided to optical bus 450. Each optical bus provides their input signal (in attenuated form) to a corresponding input port of optical bus 430. Optical bus 430 mixes each received signal to provide the flat tilt output signal, which is a WDM signal.

As described above, and in accordance with the invention, an optical bus provides significant advantages over mechanical or electrical bus construction, resulting in low power, no moving parts (robustness), zero cross talk and low loss. In addition, the optical nature of this design allows any Ethernet framing to be preserved and thus preserves Quality of Service (QoS), VLAN (virtual local area network) tagging and payload. Due to the optical design of the bus, standardized link aggregation protocols may be applied as separate gigabit links. Applications for metro-ring, metro access and enterprise access is possible with this bus design, and at a reduced cost.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although a light guide was illustrated in the context of an optical fiber, the light guide could also be formed using optical integrated circuit techniques. Similarly, although the illustrative embodiment described the use of embedded elements such as thermal switches and optical beam splitters, other elements may be used such as "optical bubble-jet technology" elements formed into an in-line array within a light guide structure. Such an array utilizes multiple optical bubble elements placed in-line with an associated input window for receiving input optical signals along the length of the light guide structure. The individual optical bubble elements are driven through individual control signals associated with each individual input signal position.

What is claimed is:

1. An optical bus, comprising:

a light guide comprising an optical channel for propagating an optical signal;

a plurality of elements embedded along said optical channel, each of said elements comprising two input ports for receiving the optical signal from said optical channel and for receiving a second optical signal from a respective associated access port in said light guide, wherein each of said elements is controllable to propagate one of the two input optical signals along said optical channel and block the other of the two input optical signals from further propagation.

2. The optical bus of claim 1, wherein said light guide is an optical fiber.

3. The optical bus of claim 1, wherein the plurality of elements are thermal switches at predetermined intervals in said optical channel.

4. The optical bus of claim 3, further comprising a control element for providing control signals for each of the thermal switches.

* * * * *